United States Patent
Tinnerman

[11] 3,711,137
[45] Jan. 16, 1973

[54] LATH TO STUD CLIP

[76] Inventor: George A. Tinnerman, 3600 Stewart Avenue, Miami, Fla. 33133

[22] Filed: Sept. 30, 1970

[21] Appl. No.: 76,780

[52] U.S. Cl.........287/189.35, 287/20.92 W, 52/714, 52/489
[51] Int. Cl..............................................F16b 5/07
[58] Field of Search..........287/20, 189.35, 20.92 W, 20.92 J, 287/189.36 D; 85/36, 13, 31; 151/41.75; 24/81 B, 73 B, 73 D; 52/489, 714, 361

[56] References Cited

UNITED STATES PATENTS

| | | | |
|---|---|---|---|
| 2,325,766 | 8/1943 | Gisondi | 85/13 X |
| 1,714,681 | 5/1929 | Loucks | 287/189.35 |
| 1,732,752 | 10/1929 | Hull | 287/20.92 W X |
| 2,282,631 | 5/1942 | Winship | 52/361 X |
| 2,382,474 | 8/1945 | Gambo | 52/361 X |

Primary Examiner—David J. Williamowsky
Assistant Examiner—Wayne L. Shedd
Attorney—Revere B. Gurley

[57] ABSTRACT

A fastener in the form of a clip formed from sheet metal has a pair of tongues struck out and spaced from one side to engage a flange of a support and a bendable prong, struck out from the base between the tongues and projecting perpendicularly from the opposite side of said tongues, so that the tongue can be projected through a panel of metal lath and bent over to secure the lath to the support. The prong may be reduced in width adjacent the base to facilitate bending. Two tongues facing the first two tongues struck out on the same side are bent from the base and engage the support to prevent withdrawal of the clip.

2 Claims, 7 Drawing Figures

PATENTED JAN 16 1973 3,711,137
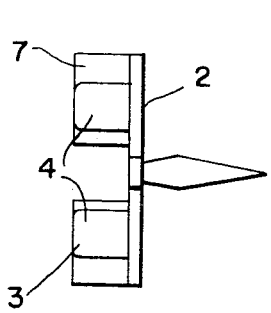 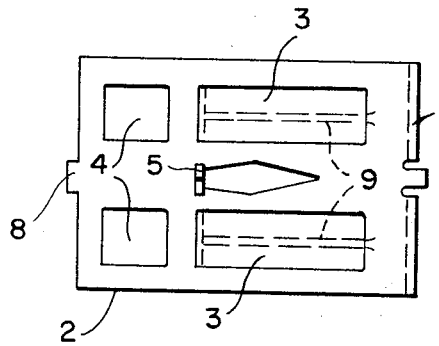 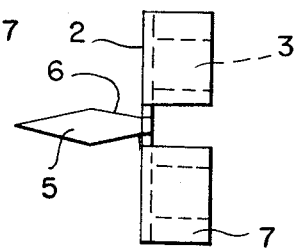
FIG. 2    FIG. 1    FIG. 3
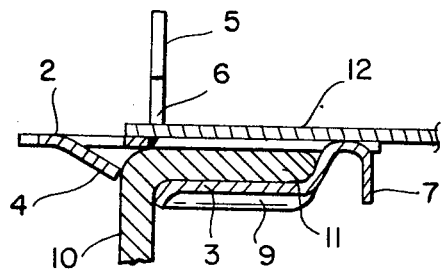 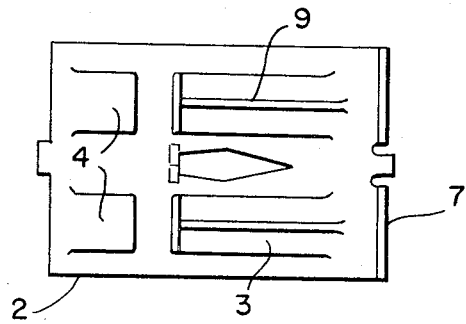
FIG. 5    FIG. 4
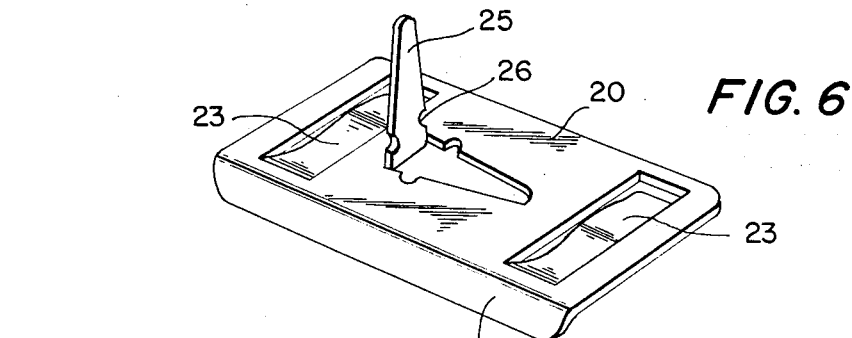
FIG. 6
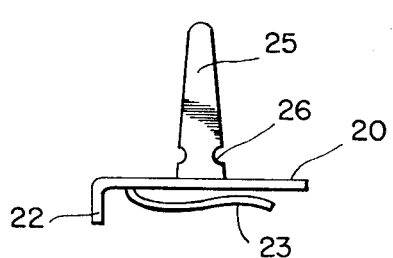
FIG. 7
INVENTOR
GEORGE A. TINNERMAN
BY  *Revere B. Gurley*
ATTORNEY

LATH TO STUD CLIP

NATURE AND OBJECTS OF INVENTION

This invention relates to a fastener, particularly a fastener to secure a perforatable panel such as metal lath to a flanged metal support.

In building construction, the fastening of metal lath to metal studs and similar supports requires special fasteners, which must be inexpensive and simple and fast to install, if the costs are to be kept competitive. The object of this invention is to provide a sheet metal fastener for this purpose, which may be quickly stamped out and easily applied to a stud, and then be secured to the metal lath to hold the lath on the stud.

DRAWINGS

In the drawings:

FIG. 1 is a plan view of the fastener.

FIG. 2 is an end elevation looking toward the left end of FIG. 1.

FIG. 3 is an end elevation looking toward the right end of FIG. 1.

FIG. 4 is plan view of the opposite face from FIG. 1.

FIG. 5 is a sectional view showing the fastener in use.

FIG. 6 is a perspective view of a modified form of fastener.

FIG. 7 is an end elevation of the fastener shown in FIG. 6.

GENERAL DESCRIPTION

The fastener, shown as the clip 2 in FIGS. 1 to 5, is quickly stamped out of a sheet metal blank. The tongues 3 struck out parallel to the sides with their bases adjacent one end, extend toward the opposite end and are spaced from the base to engage the flange 11 on a metal support 10. Adjacent said opposite end, two tongues 4 are cut out of the base with their free ends facing the tongues 3. Substantially in the center of the base, and between the tongues 3, a pointed prong 5 is struck out of the base and bent to extend upwardly. This prong is made narrower at 6 adjacent the base, to facilitate bending.

Flanges 7 on one end provide a surface for pressing or driving the fastener or clip on to the flange of the stud or support. Tabs 8 in the center of each end act as carrying tabs to support the element in the machine during manufacture.

As shown in FIG. 5, the clip 2 is driven or pressed on to the flange 11, the tongues 3 engaging the flange to hold the clip on the flange and prevent shifting. The tongues 4 may be struck down at an incline to the base to engage the opposite side of the stud and prevent movement of the fastener. The tongues 3 may be strengthened by the ribs 9. Metal lath 12, which is of a mesh-like formation, is driven or pressed on to the prong 5, and the prong is then bent over to secure the metal lath to the stud, the bent prong at the same time, preventing movement of the clip off the flange 11. The narrow or tapered portion 6 of the prong adjacent its base causes the prong to bend close to the metal lath and to secure it firmly to the stud.

In the form shown in FIGS. 6 and 7, the fastener 20 is formed with the struck out tongues 23, similar to those in FIGS. 1 to 5. A flange 22 extends along the side adjacent the bases of the tongues 23. A prong 25 is struck out from the base between the tongues and is bendable normal to the tongues. Notches 26 facilitate bending of the tongue to secure metal lath, in a manner similar to the narrow portion in FIGS. 1 to 5. Bending over the tongue will hold the clip in place on the flange of the support as in the first form.

As will be obvious, the prong in FIG. 5 may be used with the form of clip in FIG. 1, or vice versa. Similarly, features shown in FIGS. 1 to 5 may be applied to the clip of FIG. 6. Other types of perforatable panels may be secured in the same manner by this type of clip.

I claim:

1. A fastener for securing a perforatable panel to a flanged support comprising a clip having a pair of tongues struck out from the base of the clip with their attached ends adjacent to and spaced from one edge of said base and with free ends spaced from and parallel to said base to embrace the flange of said support, a flange perpendicular to said base formed on the end of said base adjacent the attached ends of said tongues, a bendable prong struck out from said base between said tongues and formed straight and perpendicular to said base on the opposite side from said tongues, said prong being formed adjacent said base with a pair of opposed notches in its edges spaced from said base a distance equal to the thickness of said panel to form a portion of less width than outwardly of said portion, said prong penetrating said panel and being bent over at said notches parallel to said base to secure said panel against said base and on said support.

2. A fastener for securing a perforatable panel to a flanged support comprising a clip having a base and a pair of tongues struck out from the base of the clip with their attached ends spaced from one end and with their free ends spaced from and parallel to said base to embrace the flange of their support, a pair of flanges perpendicular to said base formed on the end adjacent the attached ends of said tongues, a second pair of tongues struck out from said base adjacent its other end with their free ends extending toward said first tongues, a prong struck out from the base between said first pair of tongues and extending perpendicular to said base on the opposite side from said first pair of tongues, said second pair of tongues being bent downwardly inclined from the base to engage the support and prevent withdrawal of the first set of tongues from said flange, said prong having opposed notches in its edges spaced from said base a distance equal to the thickness of said panel to form a portion of reduced width so that it is bendable over the penetrated panel parallel to said base to secure said panel to said clip and thus hold said panel on said support and prevent withdrawal of said clip from said flange of said support.

* * * * *